US007376437B2

(12) United States Patent
Molkdar et al.

(10) Patent No.: US 7,376,437 B2
(45) Date of Patent: May 20, 2008

(54) RADIO RESOURCE MANAGEMENT

(75) Inventors: Davood Molkdar, Chandlers Ford (GB); Walter Featherstone, Swindon (GB); Rorie O'Neill, Swindon (GB); Jonathan Wallington, Bristol (GB)

(73) Assignee: Motorola, Inc., Schaumburg, IL (US)

( * ) Notice: Subject to any disclaimer, the term of this patent is extended or adjusted under 35 U.S.C. 154(b) by 183 days.

(21) Appl. No.: 10/573,006

(22) PCT Filed: Sep. 1, 2004

(86) PCT No.: PCT/EP2004/051984

§ 371 (c)(1),
(2), (4) Date: Mar. 21, 2006

(87) PCT Pub. No.: WO2005/053183

PCT Pub. Date: Jun. 9, 2005

(65) Prior Publication Data

US 2007/0038886 A1 Feb. 15, 2007

(30) Foreign Application Priority Data

Nov. 28, 2003 (GB) ................. 0327800.9

(51) Int. Cl.
*H04B 7/00* (2006.01)
(52) U.S. Cl. ................. 455/522; 455/68; 455/69
(58) Field of Classification Search ............ 455/522, 455/69, 561, 424, 68, 115.3, 126, 127.1, 296, 455/127.2, 135, 226.3, 277.2; 370/318, 335, 370/342
See application file for complete search history.

(56) References Cited

U.S. PATENT DOCUMENTS

| 6,094,585 | A | 7/2000 | Dajer et al. |
| 6,278,882 | B1 * | 8/2001 | Choi .................... 455/453 |
| 6,292,677 | B1 | 9/2001 | Hagen |
| 6,577,880 | B1 | 6/2003 | Ishida et al. |
| 2003/0003921 | A1 * | 1/2003 | Laakso .................... 455/453 |
| 2003/0031130 | A1 * | 2/2003 | Vanghi .................... 370/235 |
| 2003/0133415 | A1 * | 7/2003 | Kim et al. ............... 370/235 |

FOREIGN PATENT DOCUMENTS

| EP | 1280285 B1 | 1/2003 |
| EP | 1087541 B1 | 2/2005 |
| KR | 2003010390 A | 2/2003 |
| WO | WO 03096571 A | 11/2003 |

* cited by examiner

Primary Examiner—Matthew D. Anderson
Assistant Examiner—Dominic E. Rego

(57) ABSTRACT

An apparatus and method of generating downlink power information for a multi-sector base transceiver site in which power can be shared between existing amplifiers includes a first step of gathering (S10) downlink power information for each sector. When the total power required by the sectors is less than the total power available from the base transceiver site, a next step includes modifying (S20) the information to pre-empt traffic loading such that a more heavily loaded sector will be disproportionately allocated more power than a less heavily loaded sector. A next step includes forwarding (S30, S40) the information to controllers of the base transceiver site. A next step includes determining a loading of each sector using thresholds to determine an overload in sectors depending on the information, wherein the power to each sector is adjusted disproportional to the degree with which the sector is loaded.

13 Claims, 1 Drawing Sheet

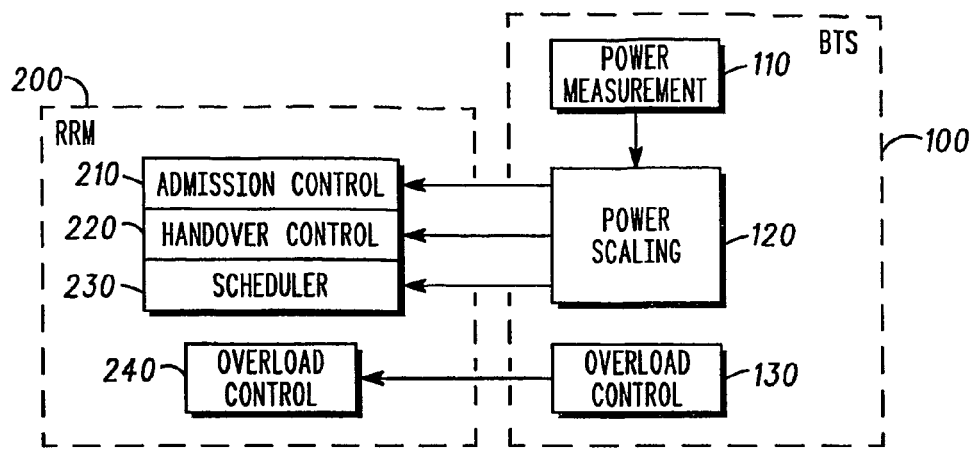
*FIG. 1*
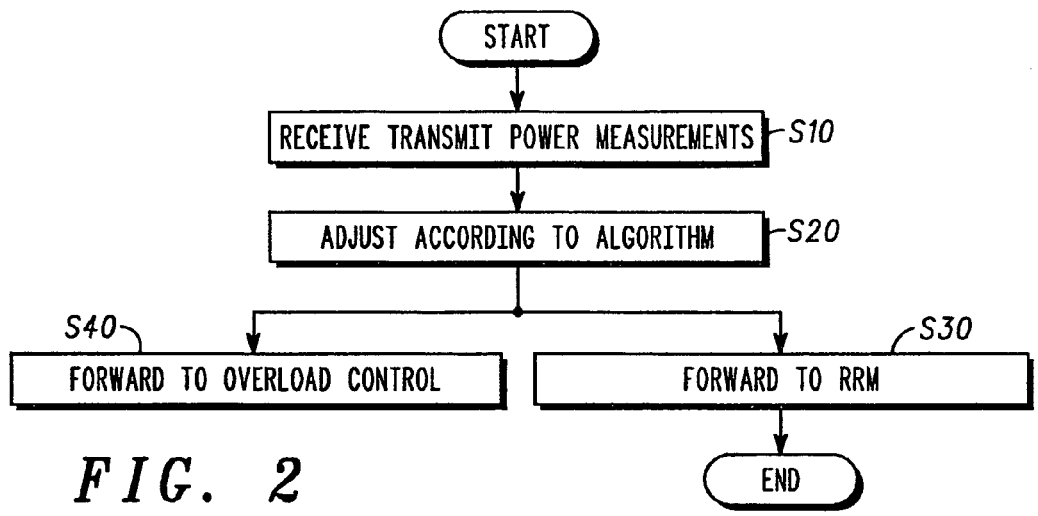
*FIG. 2*
*FIG. 3*

RADIO RESOURCE MANAGEMENT

BACKGROUND OF THE INVENTION

The present invention relates generally to radio resource management in a wireless communication system. Specifically, the present invention relates to a method and apparatus for generating downlink power information for a multi-sector base transceiver site in which power can be shared between the sectors. Such information can be used in radio resource management in a wireless communication system.

In wireless communication systems, a user device, which is typically mobile, is in wireless communication with a base transceiver station, which generally provides a communication connection to other user devices in wireless communication with the base transceiver station, or with other user devices attached to a communication system to which the base transceiver station belongs, such as a cellular communication system, or with an external network such as the public switched telephone network (PSTN) or the Internet for example. The direction from the user device to the base transceiver station is called uplink and the direction from the base transceiver station to the user device is called downlink.

In general, a base transceiver station has a receive section and a transmit section. The receive section receives uplink radio frequency signals from the user device via an antenna, mixes the received radio frequency signal to obtain a base band signal and demodulates/decodes the resulting base band signal to obtain the received data, for example signaling or message data or user data for onward transmission to a destination, for example via a cellular communication system to which the base transceiver station belongs to another user device.

The transmit section receives data for transmitting to a user device in contact with the base transceiver station, modulates/codes the data to obtain a base band signal for the user, and then mixes the base band signal to receive an radio frequency signal for the user. The radio frequency signal for the base transceiver station, i.e. the cumulative radio frequency signal for all user devices, is then amplified by a power amplifier prior to being transmitted via the base transceiver station antenna.

In order to increase capacity in the communication system, a base transceiver station site may be sub-divided into separate sectors or cells, each of the sectors or cells being provided with a separate power amplifier and antenna. In this situation it has been found to be advantageous to pool the power amplifier resources of the sectors of a multi-sector base transceiver station.

This can be achieved by sharing signals to be amplified for each sector across all of the power amplifiers i.e. N input signals are split and are then recombined into N new signals after amplification by the power amplifiers.

This arrangement enables the required dynamic range of each of the power amplifiers to be reduced, as the signal amplification is shared across a pooled resource of power amplifiers, leading to a reduction in cost of the power amplifiers. This is particularly important in Code Division Multiple Access (CDMA) systems due to the inherently large dynamic range of the resulting aggregate signal, which requires linear amplification. In addition, this arrangement provides automatic power amplifier redundancy, since failure of one of the power amplifiers will not result in a sector losing all power amplification. Finally, this arrangement can enable power sharing between different systems, e.g. AMPS and IS95 systems, where the base transceiver stations are co-located.

In general, the radio resources available to a base site are finite, and are divided by frequency and/or time and/or codes into a number of physical and logical channels, according to the wireless technology employed. A base transceiver station typically supports a number of user devices, and therefore the radio resources i.e. the different channels available to the base station must be allocated to the different user devices. In general, this allocation is handled by a Radio Resource Management function.

In many systems, some Radio Resource Management functions may depend at least partially on the total power available per cell. This is particularly true of Code Division Multiple Access (CDMA) systems, in which downlink Radio Resource Management functions such as admission control and scheduling of users is generally based on the number of code channels available and on the total transmit power available per cell. In most CDMA systems, the number of orthogonal codes available is sufficient and does not generally impose a limitation. Therefore, the system capacity is limited by the maximum transmit power capability of the cell, which in turn is governed by the rated power of the base transceiver station power amplifier.

The Radio Resource Management function generally relies on power measurements from the base transceiver station, in particular the per user code power and the total transmit carrier power to determine how close each individual cell is to the maximum capacity of the cell i.e. the rated power of the amplifier.

BRIEF SUMMARY OF THE INVENTION

The present invention seeks more effectively to utilize shared power amplifier resources in a multi-sector base transceiver station.

According to a first aspect of the present invention, there is provided a method of generating downlink power information for a multi-sector base transceiver site in which power can be shared between the sectors as claimed in claim 1.

According to a second aspect of the present invention, there is provided an apparatus for generating downlink power information for a multi-sector base transceiver site in which power can be shared between the sectors as claimed in claim 13.

BRIEF DESCRIPTION OF THE DRAWINGS

For a better understanding of the present invention, and to show how it may be brought into effect, reference will now be made, by way of example, to the accompanying drawings, in which:

FIG. 1 illustrates the main functional blocks in a base transceiver station in accordance with an embodiment, and a radio resource management unit;

FIG. 2 is a flow chart illustrating the method of operation of the power scaling algorithm shown in FIG. 1; and FIG. 3 is a table showing exemplary modified power requirement information generated by the power scaling algorithm.

DETAILED DESCRIPTION OF THE INVENTION

The present invention will be described in the context of a CDMA cellular communication system, as the invention is particularly applicable to such systems in which cell capacity is power or interference limited. However, the invention is not intended to be limited to such systems.

FIG. 1 illustrates the main functional blocks in a base transceiver station (BTS) 100 in accordance with an embodiment, and a radio resource manager (RRM) 200. Only those functions necessary to an understanding of the invention have been shown and will be described. However, a skilled person will appreciate that a practical implementation of the invention would include other functional units, which have been omitted from the present description for clarity.

The radio resource manager (RRM) 200 is typically located in a base station controller (BSC) in a Global System for Mobile Communication (GSM) system or a Radio Network Controller (RNC) in Universal Mobile Telecommunication System (UMTS). However, the RRM 200 may be co-located with the base transceiver station 100 (also called a node B in UMTS terminology) or in any other appropriate network element in a communication system, as will be apparent to a skilled person.

In the described embodiment the BTS 100 is a multi-sector BTS site, having 3 sectors, with pooled power amplifiers. In addition it is assumed that each sector has a maximum power of 20 Watts i.e. each of the power amplifiers is rated at a maximum output power of 20 Watts and thus the total combined transmit power of the multi-sector BTS site is 60 Watts. Clearly, the number of sectors in the multi-sector site and the maximum power described in connection with this embodiment are not essential, and other embodiments may be implemented with differing values.

The BTS 100 is provided with a power measurement function module 110 that generates required power output measurements for each sector i.e. a measurement of the total downlink transmission power required for each sector. The power measurement function module 110 is coupled to a power scaling module 120, and passes the required power output measurements for each sector to the power scaling module 120.

The power scaling module 120 implements the method of an embodiment described below with reference to FIGS. 2 and 3 to generate modified power measurements. The power scaling module 120 is coupled to the RRM 200 and passes the modified power output measurements to the RRM 200. This might be done by way of measurement reports. Such measurement reports may be generated continually, and/or may be generated in response to specific events or triggers.

In addition, the BTS 100 may also be provided with a BTS overload control module 130. If so, the power scaling module 120 may also be coupled to the BTS overload control module 130, and may also pass the modified power output measurements to the BTS overload control module 130.

It is envisaged that the power measurement function module 110, power scaling module 120 and, if present, the BTS overload control module 130 would generally be implemented as separate software modules within the BTS 100. However, the invention is not intended to be limited to the use of software modules, and the functionality described may be provided by software, hardware, firmware or any combination thereof, as will be apparent to a skilled person.

The RRM 200 is coupled to the power scaling module 120, as described above, to receive the modified power output measurements. As indicated above, the RRM 200 is generally located at the BSC, in a GSM system, or in the RNC in a UMTS system, and in this situation the modified power output measurements are sent across the BTS/BSC interface (Abis interface) or the RNC/NodeB interface (Iub interface). Clearly, the exact details of this transfer will be apparent to a skilled person, and so will not be described further.

The RRM 200 typically comprises various different radio resource management function modules. Exemplary illustrated radio resource management modules are: admission control module 210; handover control module 220; scheduler 230. In addition the RRM 200 also comprises an RRM overload control module 240. The various RRM modules described and others that will be known to the skilled person but have been omitted for clarity, use the transmit power measurements reported by the BTS, as will be known by a skilled person.

Specifically, the admission control module 210 uses the transmit power measurements reported by the BTS in determining whether new user devices can be admitted to the cell/sector; handover control module 220 uses the transmit power measurements reported by the BTS in determining whether to handover some user devices to a less heavily loaded cell; scheduler 230 uses the transmit power measurements reported by the BTS in determining what code and power should be allocated during scheduling of downlink transmissions to a user device; and the RRM overload control module 240 uses the transmit power measurements reported by the BTS to determine overload of each sector.

FIG. 2 is a flow chart illustrating the method of operation of the power sharing module 120 shown in FIG. 1.

Firstly, in step s10, the power sharing module 120 receives the transmit power measurements for each of the sectors from the power measurement module 110, as described above. Then, step s20, the power sharing module 120 adjusts or modifies the power measurements for at least one of the sectors in accordance with a power sharing algorithm, which will be discussed in further detail below. Finally, in step s30, the power sharing module 120 outputs the modified power requirement measurements per sector to the RRM 200.

In addition, the power sharing module 120 may send the modified power requirement measurements per sector to the BTS overload control 130, if present, in step s40.

Clearly, a number of different ways of implementing the power scaling module are possible, and the principles on which the power scaling module operates may be adapted depending on the desired effect.

The power scaling module 120 may operate to alter one or more of the reported power requirement measurements. The power scaling module 120 generally will make modifications to the relative reported powers to effect a different, more desirable, allocation of power resources between sectors by the RRM 200 than would be the case if the true power requirement information was provided to the RRM 200. Clearly, many different modifications could be made, depending upon the desired allocation of power, and the allocation of power resources between the different sectors resulting from the modified reported powers may be "fairer" or "less fair" than the allocation that would have been made had the original power measurements been supplied to the RRM 200.

When the total power required by the sectors is less than the total power available, the power scaling module 120 may adjust or modify the reported powers to pre-empt traffic loading, so as to make extra power resources available in heavily loaded or hot-spot sectors. Thus, the power scaling module may reduce the reported power of a heavily loaded sector to below the nominal power of that sector, which results in the RRM 200 being able to allocate more power to the heavily loaded sector. The evaluation of which is a heavily loaded sector may be carried out on the basis of short-term measurements, or the historical loadings experienced by the sectors may be used to determine the loadings on a sector. This enables the system as a whole to increase its capacity, as the available power resource is then effectively allocated disproportionately to heavily loaded cells.

Once the total power required by the sectors is equal to or exceeds the total power available, i.e. the resource limit is reached or exceeded, the power scaling module 120 may adjust or modify the reported powers to achieve any desirable distribution of power between the sectors. For example, the power scaling module 120 may seek to modify the reported powers to provide more power to one or more heavily loaded sectors. In some embodiments the modifications or adjustments made result in the extra power allocated being proportional to or related to the degree to which the sector is overloaded: however in other embodiments the modifications or adjustments to the reported powers may result in all overloaded cells being allocated the same extra power resource, regardless of the degree of overloading. The evaluation of which is a heavily loaded sector may be carried out on the basis of short-term measurements, or the historical loadings experienced by the sectors may be used to determine the loadings on a sector. Additionally, for a sector where the reported power is less than the nominal sector power, the power scaling module 120 may endeavour to maintain the reported power at less than the nominal sector power to ensure that users in that sector are not unfairly or unnecessarily penalized by the implemented power sharing between sectors.

In the event that one or more of the power amplifiers fails, the powers reported by the power scaling module 120 may be adjusted or modified to distribute the remaining power between the sectors to achieve any desirable distribution of power between the sectors. For example, the power scaling module 120 may seek to modify the reported powers to provide more power to more heavily loaded sectors. In some embodiments the modifications or adjustments made result in extra power allocated being proportional to or related to the degree to the load experienced by the sector: however in other embodiments the modifications or adjustments to the reported powers may result in all sectors being allocated the same, reduced, power resource, regardless of the degree of loading. The evaluation of loading of a sector may be carried out on the basis of short-term measurements, or the historical loadings experienced by the sectors may be used to determine the loadings on a sector. In one embodiment, the reported powers are adjusted such that sector or sectors associated with the failed amplifier may be penalized more heavily, by a greater reduction in their capacity, than the other sectors in the shared power site. In this way the impact on the other sectors is minimized, while still providing capacity to the sector whose amplifier has failed.

In addition, the power scaling module 120 may also alter the total reported power.

In general it is desirable for the total of the modified power requirement measurements for the sectors reported to the RRM 200 to be equal to the total of the true power requirement measurements for the sectors, in particular when the true total power is less than or equal to the total available power across all sectors at the base site. This ensures that the RRM 200 maintains realistic information on the total loading in the base site sectors and modifications to the reported power requirement measurements implemented by the power scaling module 120 merely affect the relative allocation of power resources between the different sectors.

However, in the event of a power amplifier failure it is desirable for the total of the modified power requirement measurements for the sectors reported to the RRM 200 to be greater that the total of the true power requirement measurements for the sectors. This increase in the reported powers above the actual powers will result in the RRM 200 reducing the total loading in the base site sectors to at or below the true available power.

In one embodiment of the invention the power scaling module 120 is equipped with a multi-bandwidth filter to determine short, medium and long term power requirements of each sector at a base site. The power scaling module 120 may then use this information to activate different levels of power borrowing from one sector to another sector, by scaling the sector powers before they are transmitted to the RRM 200.

In particular the power scaling module 120 may use information relating to long term power levels, or to variance information, in determining modifications to the reported power levels. For example, if the short term power requirement measurement for a sector, or the total short term power requirement measurement for all sectors, indicates that a power limit, for example the 60 W total power limit, is being exceeded, but the long term power level information or variance information indicates that such over-power excursion is likely to be short-lived and that therefore the power amplifiers are likely to be able to provide the required extra power for the expected duration, the power scaling module 120 may take this into account when adjusting the measurements reported to the RRM 200. Thus, for example, the reported measurements may result in the RRM 200 actually allocating more than the total nominal power limit for a period of time.

In addition the power scaling module 120 may use long term or historical information about loadings in different sectors when adjusting the reported powers. For example, if one sector in a multi-sector power sharing site is always or predominantly more heavily loaded than another sector in the multi-sector power sharing site, the power scaling module may more readily allocate spare capacity and/or may allocate more of the available spare capacity of the lightly-loaded sector to the more heavily loaded sector than if the average loading of the sectors is about even and a difference in loadings can be expected to be more short lived.

FIG. 3 is a table showing exemplary modified power requirement information generated by the power scaling module 120. The illustrated examples may be considered separately, or may alternatively be considered sequentially to illustrate the use that the power scaling module 120 may make of historical information of sector loadings. Clearly, the details of the modifications or adjustments to reach the reported figures of the illustrated examples can be modified by the skilled person within the scope of the invention to achieve any desired power sharing by the RRM 200.

In the first example, the rated power per sector at the site is 20 W, and so the RRM 200 will operate to ensure that the loading per sector will not result in a transmit power per sector that exceeds 20 W. However, as the site supports power sharing between the sectors, it is able to support a total transmit power of 60 W irrespective of how the power is distributed between the cells.

In the first example, sector 1 is highly loaded and sectors 2 and 3 are relatively lightly loaded. Sector 1 can therefore be considered a hotspot. If the BTS reports back the true transmit powers for the sectors of 30 W-10 W-10 W, the RRM overload control module 240 will recognize an overload in sector 1 and the RRM 200 will reduce the loading of sector 1, so as to reduce the sector 1 transmit power requirement of 30 W to below the 20 W rated maximum. Specifically, the admission control module 210 may cease admitting any new users to sector 1 and/or the handover control module 220 may handover some users in sector 1 to another cell and/or the scheduler 230 may reduce the power available for downlink transmissions to users in sector 1.

However, the total power requirement is only 50 W, which is below the total base site power capability of 60 W, and thus could be accommodated by the base site. In order to avoid the unnecessary loss of system capacity that would be caused by the RRM 200 reducing the loading of sector 1, the power scaling module 120 modifies the power measurements prior to forwarding the power measurements to the RRM 200 as set out in step s20 in FIG. 2.

In the first illustrated exemplary example, the report 30 W-10 W-10 W is modified by the power scaling module 120 to 15.4 W-17.3 W-17.3 W for example. On receiving the modified report, the RRM 200 will be able to schedule more users in any cell, thus ensuring that system capacity is made available where it is needed most.

In this example, it should be noted that reported power in the most heavily loaded sector, sector 1, is less than the reported powers in the other two sectors, sectors 2 and 3. In this way, sector 1 is made to look as if it is less heavily loaded than the other two cells and so the RRM 200 will be able to allocate proportionally more power or extra users to the most heavily loaded sector, sector 1. On receiving the adjusted reported figures the RRM 20 will be able to allocate 4.6 W extra capacity to sector 1, but will be able to allocate only 2.7 W extra capacity to sectors 2 and 3. Thus capacity is be preferentially given to the most heavily loaded sector, e.g. a hot spot, while still enabling extra capacity to be added to the remaining less heavily-loaded sectors.

In the second example, sector 1 is still loaded above its rated maximum, sector 2 is now loaded at its rated maximum and sector 3 is still relatively lightly loaded.

The total power requirement is 60 W, which is the rated maximum power for the BTS site.

If the BTS reports back the true transmit powers for the sectors of 30 W-20 W-10 W, the RRM overload control module 240 will recognize an overload in the hot-spot sector 1 and the RRM 200 will reduce the loading of sector 1 so as to reduce the sector transmit power requirement of 30 W to below the 20 W rated maximum. Specifically, the admission control module 210 may cease admitting any new users to sector 1 and/or the handover control module 220 may handover some users in sector 1 to another cell and/or the scheduler 230 may reduce the power available for downlink transmissions to users in sector 1. In addition the RRM 200 will recognize that sector 2 is at its maximum loading of 20 W. Thus, the admission control module 210 may cease admitting any new users to sector 2 and/or the handover control module 220 may handover some users in sector 1 to another cell and/or the scheduler 230 may reduce the power available for downlink transmissions to users in sector 1.

The total power requirement is 60 W, which is equal to the total base site power capability of 60 W, and thus could be accommodated by the base site. In order to avoid the unnecessary loss of system capacity that would be caused by the RRM 200 reducing the loading of sectors 1 and 2 unduly, the power scaling module 120 modifies the power measurements prior to forwarding the power measurements to the RRM 200 as set out in step s20 in FIG. 2.

Therefore, in the first exemplary embodiment, the adjustment of the reported powers by the power scaling module 120 has the effect of satisfying all the existing power requirements and preferentially enabling more power to be allocated to a hot spot sector compared with more lightly loaded sectors. Effectively, spare capacity has been transferred from the two lightly loaded sectors to the hot spot.

In the second illustrated exemplary example, the true power measurement 30 W-20 W-10 W is modified by the power scaling module 120 to 22 W-19 W-19 W for example.

On receiving the modified report, the RRM 200 will still consider the hotspot sector 1 to be overloaded and will therefore act for example to reduce the loading in the hot-spot sector 1 to 20 W. However, since the reported power is only 22 W instead of the true figure of 30 W, the RRM will reduce the loading on sector 1 by only 2 W, giving an actual loading of 30−2=28 W as the true power used by sector 1.

Since 19 W has been reported for both sectors 2 and 3, the RRM 200 will be able to allocate 1 W more power to each of these sectors, should this be required.

Therefore, in the second exemplary embodiment, the adjustment of the reported powers by the power scaling module 120 has the effect of: reducing the capacity of the most heavily loaded sector 1, but not by as much as would have been the case if the true figure of 30 W was reported; enabling slightly more capacity in the fully loaded sector 2; and severely reducing the amount of available capacity in the lightly loaded sector 3, while still enabling further use of this sector as necessary. Effectively, most of the spare capacity not being used by the lightly loaded sector 3 has been transferred to the more heavily loaded sectors i.e of the nominal allocation of 10 W not being used by sector 3, 8 W has been allocated to the hot spot sector 1 to increase the true power used by that sector to 28 W, 1 W has been allocated to sector 2 to allow a further increase in power requirement for that sector, and 1 W has been retained to allow a further increase in power requirement for sector 3.

The situation described in the second example is understood to occur after the situation in the first example and therefore in this exemplary illustration almost all of the spare capacity of sector 3 has been effectively re-allocated to the other two sectors because for example sector 1 has historically been very overloaded and sector 3 has been very underloaded. However, if the relative loadings of the sectors described in the second example occurs in isolation (ie there is no history of a difference in relative loading between the sectors) the power scaling module 120 might adjust the reported powers to allocate less of the spare capacity from sector 3 to sectors 1 or 2. Thus for example, in this alternative embodiment the reported power may be 26 W-18 W-16 W leading to a reduction in the true power for sector 1 to 30−6=24 W owing to the reported overload of 6 W, and to a potential for capacity increase in sector 2 of 2 W (20−18=2 W) and in sector 3 of 4 W (20−16=4 W). This effectively retains some of the spare capacity for sector 3 use. Of course, it is not necessary in all embodiments for information about historical levels of relative loadings to be taken into account by the power scaling module 120 when adjusting the reported powers.

In the third illustrative example the true power measurements of 30 W-25 W-15 W are modified by the power scaling module 120 to 27 W-24 W-16 W.

On receiving the modified report, the RRM 200 will still consider the hotspot sector 1 to be overloaded and will therefore act for example to reduce the loading in the hot-spot sector 1 to 20 W. However, since the reported power is only 27 W instead of the true figure of 30 W, the RRM will reduce the loading on sector 1 by only 27−20=7 W, giving an actual loading of 30−7=23 W as the true power used by sector 1.

On receiving the modified report, the RRM 200 will also consider the sector 2 to be overloaded and will therefore act for example to reduce the loading in sector 2 to 20 W. However, since the reported power is only 24 W instead of the true figure of 25 W, the RRM will reduce the loading on sector 1 by only 24−20=4 W, giving an actual loading of 25−4=21 W as the true power used by sector 1.

Since 16 W has been reported for sector 3, the RRM 200 will be able to allocate 4 W more power to sector 3, should this be required.

Therefore, in the second exemplary embodiment, the adjustment of the reported powers by the power scaling module 120 has the effect of: reducing the capacity of the most heavily loaded sector 1, but not by as much as would have been the case if the true figure of 30 W was reported; reducing the capacity in the overloaded sector 2; and reducing the amount of available capacity in the relatively lightly loaded sector 3, while still enabling further use of this sector as necessary. Effectively, some (4 W) of the spare capacity not being used by the lightly loaded sector 3 (i.e. 5 W) has been transferred to the more heavily loaded sectors, to enable the more heavily loaded sectors 1 and 2 to accommodate some of their increased capacity while still enabling the RRM to allocate more capacity to sector 3 if the sector 3 demand increases. In this example the transferred capacity has been allocated more to the more heavily loaded cell, i.e. 3 W extra was given to sector 1 as opposed to 1 W extra given to sector 2, although clearly a more equal or a less equal allocation may be made within the discretion of the skilled person.

The situation described in the third example is understood to occur after the situation in the first and second examples and therefore in this exemplary illustration more of the transferred capacity may have been effectively re-allocated to sector 1 than to sector 2 because for example sector 1 has historically been more overloaded than sector 2. However, if the relative loadings of the sectors described in the first example occurs in isolation (ie there is no history of a difference in relative loading between the sectors) the power scaling module 120 might adjust the reported powers to allocate the spare capacity more evenly. Thus for example, in this alternative embodiment the reported power may be 28W-23W-16 W leading to a reduction in the true power for sector 1 to 30−8=22 W owing to the reported overload of 8 W, and to a reduction in the true power for sector 2 to 25−3=22 W owing to the reported overload of 3 W. Of course, it is not necessary in all embodiments for information about historical levels of relative loadings to be taken into account by the power scaling module 120 when adjusting the reported powers.

In the fourth illustrative example, sector 1 is loaded above its rated maximum, sector 2 is loaded at its rated maximum and sector 3 is relatively lightly loaded. The total power requirement is 60 W, which is the rated maximum power for the BTS site. However, in this example, one of the power amplifiers has failed, and so the maximum available power for the site is 40 W.

The RRM 200 is not aware that one of the power amplifiers has failed, and therefore will continue to operate on the basis that 20 W is available in each sector. However, the BTS 100 is aware that one of the power amplifiers has failed, and so the power scaling module 120 acts to modify the reported power measurements to ensure that the RRM 200 reduces the total load across all sectors, whilst also leveling the loading across the sectors as far as possible.

In the illustrated exemplary example, the true power measurement report 30 W-20 W-10 W is modified by the power scaling module 120 to 30 W-26.5 W-23.5 W for example. Thus instead of the total reported power being the true power measurement of 60 W, the modified power report indicates a total power of 80 W, all sectors being above the power limit of 20 W. However, the relative difference between the reported powers for the sectors is less than the relative difference between the true powers.

In response to the modified measurement report, the RRM overload control module 240 will recognize an overload in all sectors and the RRM 200 will reduce the loading of all sectors so as to reduce the respective sector transmit power requirement. Specifically, the admission control module 210 may cease admitting any new users and/or the handover control module 220 may handover some users to another cell and/or the scheduler 230 may reduce the power available for downlink transmissions to users.

The RRM modules will operate to reduce the respective sector transmit requirement to a degree related to the scaling in the modified power report.

The modified report indicates that power requirement in sector 1 is 30, and therefore the RRM 200 will act to reduce the power requirement to the rated 20 W by reducing the power requirement by 30−20=10 W The true power will therefore be modified to 30−10=20 W.

The modified report indicates that power requirement in sector 2 is 26.5, and therefore the RRM 200 will act to reduce the power requirement to the rated 20 W by reducing the power requirement by 26.5−20=6.5 W. The true power will therefore be modified to 20−6.5=13.5 W The modified report indicates that power requirement in sector 3 is 23.5, and therefore the RRM 200 will act to reduce the power requirement to the rated 20 W by reducing the power requirement by 23.5−20=3.5 W. The true power will therefore be modified to 10−3.5=6.5 W.

Thus the actual power allocated by the RRM 200 will be reduced to 20+13.5+6.5=40 W after the failure of one of the power amplifiers, but without the RRM 200 being aware of the power amplifier failure or of the power sharing between the sectors in the multi-sector base site. In addition, the access to the base site power resources is shared as evenly as possible between the sectors in order to maximize the system utilization, since the percentage reduction in capacity is the same for all sectors.

Therefore, in the fourth exemplary embodiment, the adjustment of the reported powers by the power scaling module 120 has the effect of reducing the overall capacity of the sectors to below the remaining power available whilst maintaining service in all sectors.

In the exemplary embodiment the percentage reduction in capacity owing to the failure of one of the power amplifiers is the same in all sectors. Alternatively, the reductions may be applied more heavily on one or more of the sectors. For example, in some embodiments, the more heavily loaded is the sector, the smaller is the percentage reduction applied by the power scaling module 120. Again, the power scaling module may in some embodiments take into account historical information relating to loadings of the sectors in determining the reductions to be applied.

As described above, the modified power requirement measurements generated by the power scaling module 120 are used to modify the power level threshold at which an overload alarm is raised for each of the sectors. The power level threshold may be determined from the existing power levels and the modified power requirement.

Thus, in one embodiment the allocated power and any extra capacity allowable by the RRM 200 in response to the reported powers are established. These figures are then summed to obtain the power level threshold for the sector.

Thus, in the first example where none of the sectors are being reported as overloaded, the power level thresholds are calculated as follows:

Sector 1: allocated power=30 W; extra capacity=20−15.4=4.6 W; threshold=34.6 W Sector 2: allocated power=10 W; extra capacity=20−17.3=2.7 W; threshold=12.7 W Sector 3: allocated power=10 W; extra capacity=20−17.3=2.7 W; threshold=12.7 W In the second example, where sector 1 is reported as overloaded, the power level thresholds are calculated as follows:

Sector 1: allocated power=30−(22−20)=28 W; extra capacity=0 W (overloaded); threshold=28 W Sector 2: allocated power=20 W; extra capacity=20−19=1 W; threshold=21 W Sector 1: allocated power=10 W; extra capacity=20−19=1 W; threshold=11 W In the third example, where sectors 1 and 2 are reported as overloaded, the power level thresholds are calculated as follows:

Sector 1: allocated power=30−(27−20)=23 W; extra capacity=0 W (overloaded); threshold=23 W Sector 2: allocated power=25−(24−20)=21 W; extra capacity=0 W (overloaded); threshold=21 W Sector 1: allocated power=15 W; extra capacity=20−16=4 W; threshold=19 W In the fourth example, all sectors are reported as overloaded, and so the power level thresholds are calculated as follows:

Sector 1: allocated power=30−(30−20)=20 W; extra capacity=0 W (overloaded); threshold=20 W Sector 2: allocated power=20−(26.5−20)=13.5 W; extra capacity=0 W (overloaded); threshold=13.5 W Sector 1: allocated power=20(23.5−20)=6.5 W; extra capacity=0 W (overloaded); threshold=6.5 W The necessary calculations may be carried out by the power scaling module 120 and the modified power thresholds passed to the BTS overload control module 130, or the necessary information for calculation of the modified power level thresholds may be passed to the BTS overload control module 130 for the BTS overload control module 130 to calculate the modified power thresholds.

The implementation of the invention may result in one or more of the following advantages:

capacity gains may be realized, as more users may be accommodated on more heavily loaded sectors by diverting some unused power from less heavily loaded sectors to the heavily loaded sectors;

faster reactions to load changes and the selection of scaled power measurements owing to finer time resolution of power measurements at the BTS compared with a RRM specific algorithm;

there is no requirement to modify any cell-based overload control mechanism because the power scaling algorithm may also select and set appropriate trigger thresholds for each sector. This ensures that if the per sector loading results in a required transmit power of greater than the rated power per sector, the BTS overload control does not trigger unless the total site transmit power is exceeded;

power sharing across a multi-sector BTS site is achieved purely with modification at the BTS, and the RRM function operation is unchanged. This facilitates interworking between equipment from different manufacturers, as no signaling is required between the BTS and the RRM function.

Thus in the described embodiments, an algorithm is introduced at the base site that operates transparently with regard to the existing RRM function and that exploits shared power resources at the base site to increase overall downlink system capacity.

What is claimed is:

1. A method of generating downlink power information for a multi-sector base transceiver site in which power can be shared between existing amplifiers of the sectors, the method comprising the steps:

gathering downlink power information for each sector;

when the total power required by the sectors is less than the total power available from the base transceiver site, modifying the gathered downlink power information for each sector to pre-empt traffic loading such that a more heavily loaded sector will be disproportionately allocated more power than a less heavily loaded sector;

forwarding the modified downlink power information to an overload control module and a radio resource manager controlling the multi-sector base transceiver site; and determining a loading of each sector using thresholds to determine an overload in one or more sectors depending at least partly on the modified downlink power information, wherein the power to each sector is adjusted disproportional to the degree with which the sector is loaded.

2. The method as claimed in claim 1 wherein the step of modifying the gathered downlink power information is carried out on the downlink power information for one or more of the sectors.

3. The method as claimed in claim 1 wherein the modification carried out in the step of modifying the gathered downlink power information depends on the relative magnitude of the total gathered power and the available power of the multi-sector base transceiver site.

4. The method as claimed in claim 1 wherein the step of modifying the gathered downlink power information results in the allocation by the radio resource manager of spare capacity from lightly loaded sectors to more heavily loaded sectors.

5. The method as claimed in claim 4 wherein the evaluation of respective loading on sectors is determined with regard to information relating to the loading of the sector determined by a multi-band filter.

6. The method as claimed in claim 1 wherein the step of modifying the gathered downlink power results in the amount of spare capacity allocated to a sector being related to the degree of loading or overloading of the sector.

7. The method as claimed in claim 1 wherein the step of modifying the gathered downlink power information results in the modified power information for a more heavily loaded sector being less than the modified power information of a less heavily loaded sector.

8. The method as claimed in claim 1 wherein the step of modifying gathered downlink power information results in the sum of the reported powers for the sectors becoming greater than the sum of the gathered powers for the sectors, if the sum of the gathered powers is greater than a threshold power.

9. The method as claimed in claim 8 wherein the threshold power is determined by the total power available to the base transceiver site.

10. The method as claimed in claim 1 wherein average loading and/or variance power requirements information is used in determining how to modify the gathered power information.

11. The method as claimed in claim 10 wherein average load and/or variance information is obtained from multi-band filters applied to the gathered power requirements.

12. An apparatus for generating downlink power information for a multi-sector base transceiver site in which power can be shared between existing amplifiers of the sectors, the apparatus comprising:

a power scaling module for modifying gathered downlink power information for each sector to pre-empt traffic loading such that a more heavily loaded sector will be allocated more power than a less heavily loaded sector when the total power required by the sectors is less than the total power available from the base transceiver site; and an overload control module coupled to the power scaling module and a radio resource manager controlling the multi-sector base transceiver site, the overload control module and a radio resource manager for receiving the modified downlink power information from the power scaling module, wherein the overload control module determines a loading of each sector using thresholds to determine an overload in one or more sectors depending at least partly on the modified downlink power information, and the radio resource manager adjusts the power to each sector disproportional to the degree with which the sector is loaded.

13. The apparatus as claimed in claim 12 further comprising a power measurement module for gathering downlink power information.

* * * * *